United States Patent
Ohno et al.

(10) Patent No.: US 6,892,261 B2
(45) Date of Patent: *May 10, 2005

(54) MULTIPLE OPERATING SYSTEM CONTROL METHOD

(75) Inventors: Hiroshi Ohno, Hitachi (JP); Tomoaki Nakamura, Hitachinaka (JP); Shigenori Kaneko, Hitachinaka (JP); Ryokichi Yoshizawa, Hitachinaka (JP); Naoshi Kato, Hitachinaka (JP); Manabu Yamauchi, Hitachi (JP); Toshiaki Arai, Machida (JP); Tomoki Sekiguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 53 days.

This patent is subject to a terminal disclaimer.

(21) Appl. No.: 10/774,486

(22) Filed: Feb. 10, 2004

(65) Prior Publication Data

US 2004/0177193 A1 Sep. 9, 2004

Related U.S. Application Data

(63) Continuation of application No. 09/585,120, filed on Jun. 1, 2000, now Pat. No. 6,715,016.

(51) Int. Cl.[7] .............................................. G06F 13/24
(52) U.S. Cl. ........................................ 710/260; 710/108
(58) Field of Search ............................... 710/260–269, 710/108; 709/108

(56) References Cited

U.S. PATENT DOCUMENTS

| | | | |
|---|---|---|---|
| 3,668,646 A | 6/1972 | Hemdal | |
| 4,493,034 A | * 1/1985 | Angelle et al. | ............. 713/100 |
| 4,530,052 A | 7/1985 | King et al. | |
| 4,609,920 A | 9/1986 | Segarra | |
| 4,747,040 A | 5/1988 | Blanset et al. | |
| 4,835,677 A | 5/1989 | Sato et al. | |
| 5,278,973 A | 1/1994 | O'Brien et al. | |
| 5,483,647 A | 1/1996 | Yu et al. | |
| 6,067,618 A | 5/2000 | Weber | |
| 6,327,653 B1 | 12/2001 | Lee | |
| 6,330,669 B1 | 12/2001 | McKeeth | |
| 6,393,560 B1 | 5/2002 | Merrill et al. | |
| 6,715,016 B1 * | 3/2004 | Ohno et al. | ................. 710/260 |
| 2001/0016879 A1 | 8/2001 | Sekiguchi et al. | |

FOREIGN PATENT DOCUMENTS

| | | | | |
|---|---|---|---|---|
| JP | 5-27954 A | 2/1993 | | |
| JP | 5-73340 A | 3/1993 | | |
| JP | 5-151003 A | 6/1993 | | |
| JP | 06236286 A * | 8/1994 | | ............. G06F/9/46 |
| JP | 9-62324 A | 3/1997 | | |
| WO | WO 9812635 A1 * | 3/1998 | | ............. G06F/9/46 |

* cited by examiner

Primary Examiner—Paul R. Myers
(74) Attorney, Agent, or Firm—Kenyon & Kenyon (57) ABSTRACT

An inter-OS control software for switching OS's in operation executed on a single CPU is installed, and plural OS's are made alternately executed. A control program is executed exclusively on one OS, which controls the controlled apparatus. A supervisory control program and a development environment program are executed on another OS, and a memory space is divided so as to make no effect for the operation of the control program. A higher real-time performance and reliability can be established with a single CPU architecture.

29 Claims, 7 Drawing Sheets

MULTIPLE OPERATING SYSTEM CONTROL METHOD

CROSS REFERENCES TO RELATED APPLICATIONS

This is a continuation of application Ser. No. 09/585,120 filed Jun. 1, 2000 now U.S. Pat. No. 6,715,016.

BACKGROUND OF THE INVENTION

The present invention relates to a control method of the control apparatus using a digital arithmetic processor for plant instrument control and/or various machine control, and specifically, to a control method for the multiple operating system in which plural operating systems are executed on an single processor.

In the control apparatus such as programmable logic controller (PLC) or numerical control apparatus (CNC) often used for plant instrument control and various machine controls, procedures for control logic are executed mainly. The functions other than procedures for control logic including the function for inputting the control logic into those control apparatus (development environment) and the functions for supervisory operation for the controlled status and for allowing the user to input the data in an interactive manner (human machine interface) are often realized by another apparatus such as personal computers (PC's) connected outside the control apparatus (hereinafter referred to as user interface apparatus.) In case that those functions are embedded in a single apparatus, those functions are executed by the individual internal arithmetic processors. A technology related to this kind of apparatus is disclosed, for example, in Japanese Patent Application Laid-Open Number 9-62324 (1997).

The performance of PC's used as a user interface apparatus has increased, and thus, computational power can be provided so that a single PC may cover the functions from the control logic operations to the development environment and the supervisory control up to a certain scale of control systems. However, in case of using a control apparatus comprising a PC-based hardware architecture supporting all of the system functions and applying an operating system (OS) generally used in PC's, the operations of the programs and the device drivers other than the control programs may affect the operation of the control programs themselves.

There is such a technology that computer resources are shared in common with multiple OS's and the functions generic to the individual OS's are used by loading and running plural OS's on an single CPU. Examples of this technology are disclosed in Japanese Patent Application Laid-Open Number 5-73340 (1993), Japanese Patent Application Laid-Open Number 5-27954 (1993) and Japanese Patent Application Laid-Open Number 5-151003 (1993).

Privileged instructions are executed generally in OS's. Therefore, some disability occurring in one of OS's may affects the execution of the other OS's. However, this affect is not considered in the technology in which plural OS's are loaded and ran simultaneously on a single computer, and hence, even by means of isolating the influence of the disabled OS over the other OS's by emulating the disabled OS by the other OS's as described in and Japanese Patent Application Laid-Open Number 5-1510003 (1993), the influence may be propagated onto the operations of both OS's in case that some disability may occur the OS emulating the disabled OS.

SUMMARY OF THE INVENTION

In the present invention, in order to solve the above problems, a software for controlling OS's is loaded in order to switch the executing OS's so that plural OS's may be operated alternately. The control software is made executed on the OS with higher reliability, and the user interface program is made executed on the OS with rich functionality, and thus, OS's each having specific characteristics are made executed on a single CPU. In responsive to the generation of interrupt or the request signal from OS's or the software programs running on OS's, this inter-OS control software stores and revises the context information of CPU operations (for example, register values of CPU), switches the memory spaces and restarts the OS operations in another context stored in past. In other words, the operation of the running OS is terminated and the operation of other OS's is restarted. In addition, the inter-OS control software has a function which monitors start-stop operations of the running OS'S and controls the start-stop operation of the individual OS's independently. Owing to this configuration, it will be appreciate that the hardware and software in the control apparatus can be partially initialized and that the disabled part can be automatically recovered, which leads to higher reliability of the total system.

Individual memory spaces occupied for the individual OS's and a memory space shared and accessible commonly by plural OS's are defined on the physical memory. Owing to this configuration, the individual memory spaces for the kernel and the programs are so defined that the interference among OS's such as data destruction may be avoided and that the necessary data may be shared by the programs each executed on the difference OS's. In addition, the system has such a function that the program running on a certain OS waits for the event issued by the other OS's and/or the programs running on those OS's and the inter-OS control software notifies this event. Owing to this configuration, a communication function between the programs running on the different OS's can be established.

PREFERRED EMBODIMENTS OF THE INVENTION

Figure 1:
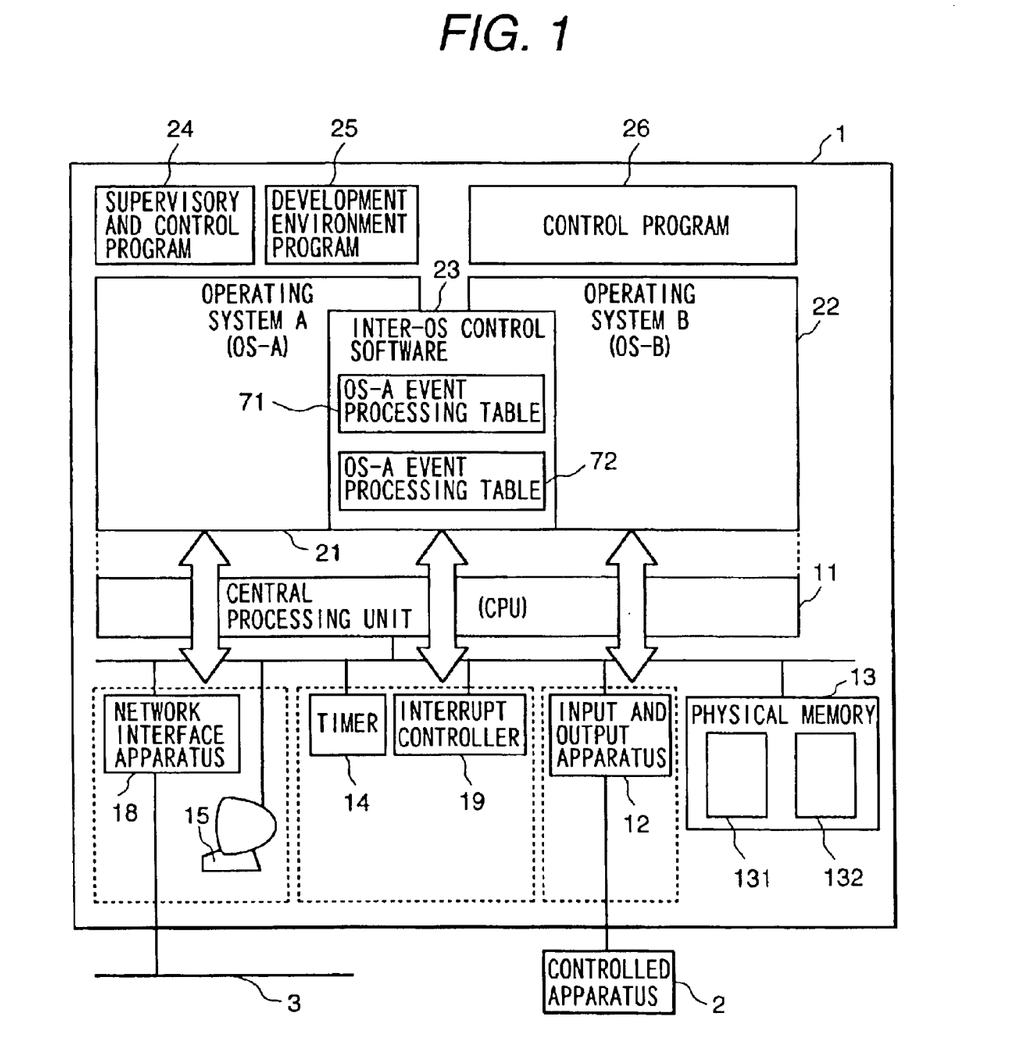
FIG. 1 is a block diagram of the embodiment using the present invention.

FIG. 1 shows a bock diagram of the control apparatus in one embodiment of the present invention.

The hardware for the control apparatus 1 comprises a central processing unit (CPU) 11, a physical memory 12, a timer 14, a user input output apparatus 16, a network interface apparatus 18 and a interrupt controller 19. This structure is the same as the structure in a general purpose personal computer (PC). The control apparatus 1 has a network interface apparatus 18 connected to the network 3, and uses it for communicating with another control apparatus and reporting the control result to the host computer.

The control apparatus has an input and output apparatus connected to the controlled apparatus 2 for exchanging signals, and acquires the information from the controlled apparatus 2 and issues the operation instruction to the controlled apparatus 2. The interrupt controller 19 of the control apparatus 1 relays the interrupt signal from the individual components of the control apparatus 1 to CPU 11 and/or masks the interrupt signal.

The software of the control comprises an operating system A (OS-A) 21 and an operating system B (OS-B) both for the hardware resource management and the executive control of the program running on it, an inter-OS control software 23 for switching OS-A and OS-B, a supervisory control program 2 and a development environment program 25 both executed on OS-A, and a control program 26 executed on OS-B. OS-A, OS-B and the inter-OS control software 23 are operated on an single CPU 11 in a privileged mode and enabled to execute all the instructions including the privileged instructions for controlling CPU 11 itself. On the other hand, the programs running on the individual OS's are operated in a non-privileged mode and can not execute privileged instructions. OS-A and OS-B contains device drivers operating in a privileged mode as well as the OS kernel, and in the following, those devices are discussed so as to be unified in the OS kernel.

The input and output apparatus 12 is controlled and occupied by OS-B. On the other hand, the user input and output apparatus and the network interface apparatus 18 used by the programs operated on OS-A are controlled and occupied by OS-A. Such a configuration is allowed that such a exigency user input and output apparatus as emergency stop button and alarm signal output and/or such a network interface apparatus as requiring real-time characteristics for communicating with another control apparatus may be controlled and occupied by OS-B and accessed by the programs running on OS-B. The physical memory 13 are separated into the area 131 for OS-A and the area 132 for OS-B. The hard wares accessed directly by the inter-OS control software 23 are limited to the timer 14 and the interrupt controller 19.

At first, the overall operation of the software and its relation to the hardware are described. In this embodiment, OS-A is assumed to be a general purpose OS commonly used in PC's. OS-A provides sophisticated user interfaces for the supervisory control program 24 and the development environment program 25. OS-A and the programs running on OS-A operate in the similar manner to the case that OS-B does not exist. Though the inter-OS control software 23 interrupts the operation of OS-A, and OS-B is switched over OS-A, as the inter-OS control software 23 recovers the interrupted operation of OS-A and restarts OS-A after completing the operation of OS-B, it is not necessary for OS-A to recognize the existence of OS-B.

On the other hand, OS-B is assumed to be one that is characterized as higher real-time performance and optimized for control programs. OS-B yields its executive status to OS-A when the programs running on OS-B have no more operations to be executed (hereinafter referred to as "idle status".)

The inter-OS control software 23 provides functions for switching the execution status between OS-A and OS-B, and for communicating among programs on OS's. The switching operation of the execution status from OS-A to OS-B is performed in case that i) an interrupt occurs at the hardware controlled by OS-B, ii) a pre-defined period of time has passed or iii) OS-A communicates to OS-B. The switching operation of the execution status from OS-B to OS-A is performed only when OS-B turns into an idle status as described above. OS-B has always a execution status in preference to OS-A owing to this switching operation. The inter-OS control software 23 operates only when the switching operation is initiated and the communication between OS's are requested, and the individual OS's are operated independently otherwise. The privileged instructions to CPU 11 are issued by the individual OS's, but are not emulated by the inter-OS control software 23. It is required that the inter-OS control software 23 may operates as a part of the individual OS's so as to enable to execute privileged mode instructions every time when either of OS's is executed. In particular, the inter-OS control software 23 is so embedded as to operates as a device driver for OS-A when OS-A is executed as a general purpose OS.

As described above, hard wares are so assigned to OS-A and OS-B as to be occupied and controlled by the individual OS's, and the operation status of OS's are switched alternately, and the individual OS's are executed independently after the switching operation. The inter-OS control software 23 switches the execution of both OS's and provides the communication function between both OS's.

Next, a method for establishing the independency between OS's is described. At first, a method for protecting the hard wares controlled and supervised by the individual OS from interference by another OS's. The interaction between individual hard wares and software includes the input and output operation for the I/O addresses assigned to the individual hard wares and the response operation of the software to the interrupts with their interrupt numbers each assigned to the individual hard ware. Thus, the independency between OS's with respect to the hard ware control is established by ensuring that the input and output operation to the I/O addresses assigned to the hardware controlled and managed exclusively by one OS and the response operation to the interrupt number assigned to this hardware may not be executed by the other OS.

In order to specify which OS should manage and occupy the individual hardware, the I/O address and the interrupt number assigned to the hardware are unified and stored in the interrupt table in the inter-OS control software 23. The inter-OS control software 23 initialize the device driver of OS-A at the start-up of the control apparatus 1. In its initialization process, the I/O address and the interrupt number of the hardware for OSB are reserved and made registered in the interrupt table. By this process, the kernel of OS-A and the other device drivers of OS-A recognize that the corresponding I/O address and interrupt number are occupied, and then, the operation to those hard wares by OS-A is disabled. On the other hand, by means that the I/O address and the interrupt number of the hardware occupied by OS-A are made acquired by OS-B directly from the inter-OS control software 23 and registered in the interrupt table, the operation to those hard wares by OS-B is made disabled. According to the above procedures, the independency between OS's with respect to the hard ware control is established.

The input and output operation to the hardware is executed by OS-A and OS-B, respectively, and is not emulated by the inter-OS control software 23. Owing to this procedure, the additional overhead due to the emulation of the input and output operation can be prevented as well as the kernel and device drivers assumed to access directly to the hardware may not be modified.

Nest, a method for establishing the independency of the physical memory space used by the individual OS's is described. The independency of the physical memory 13 is established by defining the memory areas used separately for OS-A and OS-B, respectively The memory area used commonly with OS-A and OS-B is defined for sharing the data between both OS's.

In order to define the separated areas individually occupied by OS-A or OS-B, at first, OS-A is made started when the control apparatus 1 starts up, and then, the memory areas are so defined that the physical memory area lower than the designated address specified by the start-up option of OS-A may be occupied by OS-A. After start-up of OS-A, OS-B is made started by loading OS-B onto the physical memory area higher than the designated address. The kernel of OS-B acquires the designated address recorded on the table in the inter-OS control software 23, and uses the area which is not used by OS-B under the memory management.

There are two cases for the memory area commonly shared by OS's. In one case, the memory area for the OS-A is made mapped on the address space for OS-B. In this case, the inter-OS control software 23 requests the memory management mechanism of the kernel of OS-B to add the address of the physical memory to be shared to the logical address conversion table (hereinafter referred to as "page table") for the physical memory for OS-B and to make the physical memory correspond to the logical address (hereinafter referred to as "memory mapping" or simply to "mapping".) In the other case, the memory area for OS- is made mapped on the address space for OS-A. In this case, the inter-OS control software 23 reserves the address of the physical memory to be shared as a device driver of OS-A. In this case, a function of OS-A for realizing the device driver of the memory-mapping type physical device is used. Owing to this configuration, the kernel of OS-A maps the physical memory to be shared onto the page table for OS-A, which establishes the sharing of the designated common memory area.

Next, a method for establishing the independency of the logical address spaces of the individual OS's is described. OS and the programs executed on it access to the memories with reference to logical addresses, and the conversion from logical addresses to physical addresses are automated by CPU referring to the page table. The individual memory management functions embedded in OS-A and OS-B operates the page table and perform the mapping operation. At this time, by means that the page table is made separated into tables each used exclusively by the individual OS and switched in responsive to the OS's operation privilege, the mapping operation can be executed independently by the individual OS.

The page table is a table located on the physical memory, and CPU has a register specifying the start physical address of the table. CPU obtains the address position of the page table from this register, and automates the address conversion in responsive to the obtained information. Therefore, the individual page table areas for OS-A and OS-B are defined independently on the physical memories, and the content of the register specifying the page table position is made switched so as to specify the page table for OS switched to be enabled in the OS switching operation by the inter-OS control software 23. Owing to this procedure, both OS's can operates the mapping on the individual page tables, and thus, the independency of the logical address spaces can be established.

Figure 2:
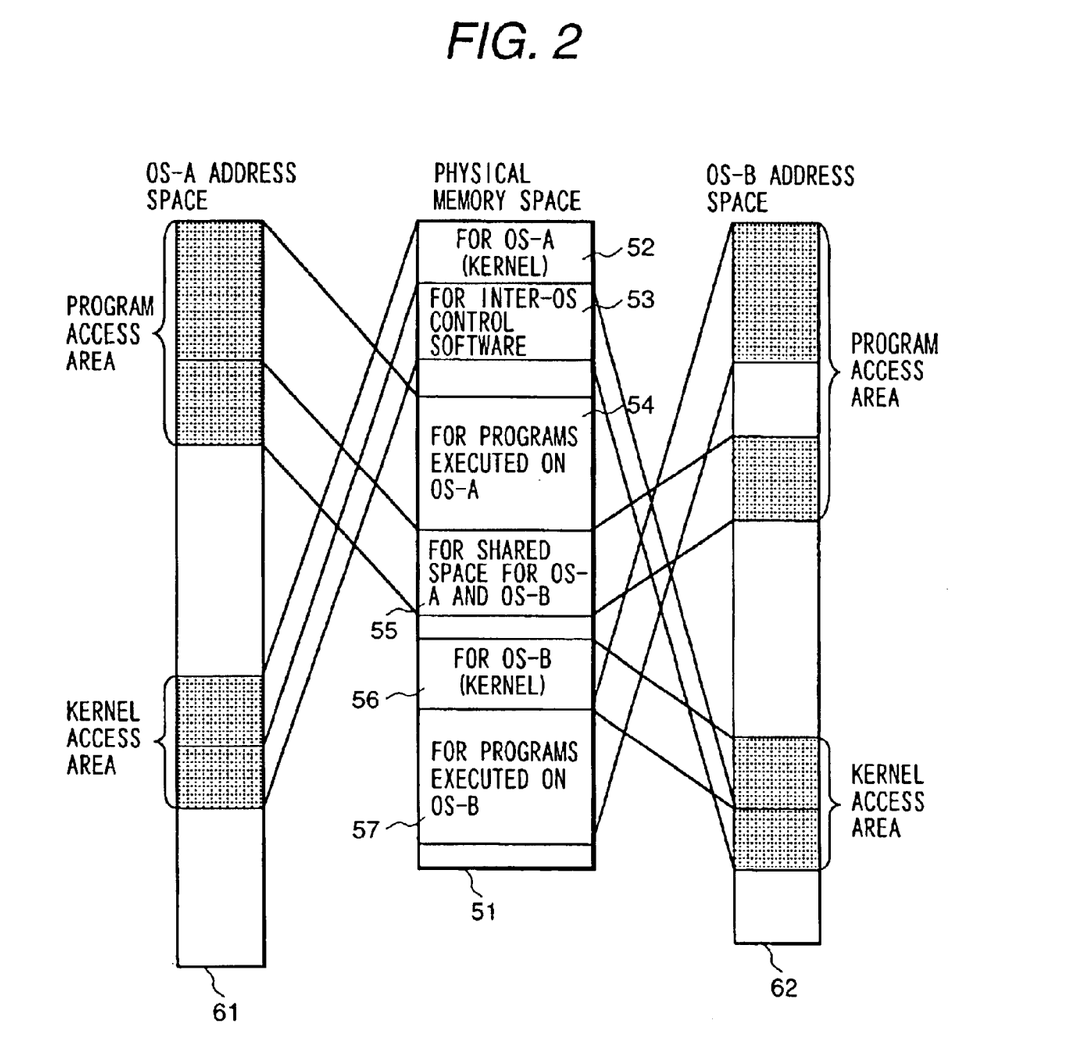
FIG. 2 is a schematic diagram of memory usage in the control apparatus.

The memory usage scheme described above for the physical memory space and the logical address space is shown in FIG. 2. The physical memory space 51 is made delimited into several areas including an area 52 for the kernel of OS-A, an area 54 for the OS-A programs, an area 56 for the kernel of OS-B and an area 57 for OS-B programs, which are made enabled to be accessed by the individual resources assigned to OS-A and OS-B. The logical address spaces 61 and 62 for the memories recognized by OS-A and OS-B are independent logical address spaces corresponding to the independent page tables of the individual OS's. When OS-A is executed, the physical memory spaces 56 and 57 occupied for OS-B are not mapped onto the logical address space 61. Owing to this configuration, the areas for OS-B are not accessed by OS-A with its execution enabled, which leads to preventing the data from being damaged accidentally. When OS-B is executed, in contrast, the physical memory spaces 52 and 54 occupied for OS-A are not mapped onto the logical address space 62. As the inter-OS control software 23 should operates in either case of OS's alternate execution, the memory area 53 is mapped in either OS and accessible by the programs executed on the individual. OS's and available for exchanging data between programs executed on the individual OS's. By means that the sharable area for. OS-A and OS-B is limited to be used for the programs executed in a non-privileged mode, it will be appreciated that the kernel and device driver for one OS is made not affected by the other OS and its programs, and the independency and reliability of the individual OS's can be established. It is allowed that the individual area may be made segmented and distributed for the managed unit of the address conversion mechanism of CPU 11 on the physical memory area 51.

According to the methods described above, the dependency of OS's can be established.

Next, the operation of the inter-OS control software 23 is described in detail. When the inter-OS control software 23 is called explicitly by the individual OS's or their programs and an interrupt is applied to CPU, it is made started up. As the inter-OS control software 23 is embedded as a device driver of OSA, the call by OS-A or programs executed on it is realized as an operation instruction directed to the corresponding device driver (for example, IOCTL instruction). As OS-B recognizes the existence of the inter-OS control software 23, OS-B or programs executed on it are called as a function all from the procedure in the kernel of OS-B. As CPU 11 calls the interrupt handler by referring to the interrupt table located on the physical memory 13 when an interrupt occurs, all the interrupt handlers are defined as routines in the inter-OS control software 23 by modifying the interrupt table. Owing to this configuration, the inter-OS control software 23 is activated when any interrupt occurs, which leads to establishing adequate procedures.

Once the inter-OS control software 23 is made start up, it switches OS's in responsive to its causal event, and performs necessary procedures for communicating between OS's. Its procedural steps are described in detail below.

Figure 3:
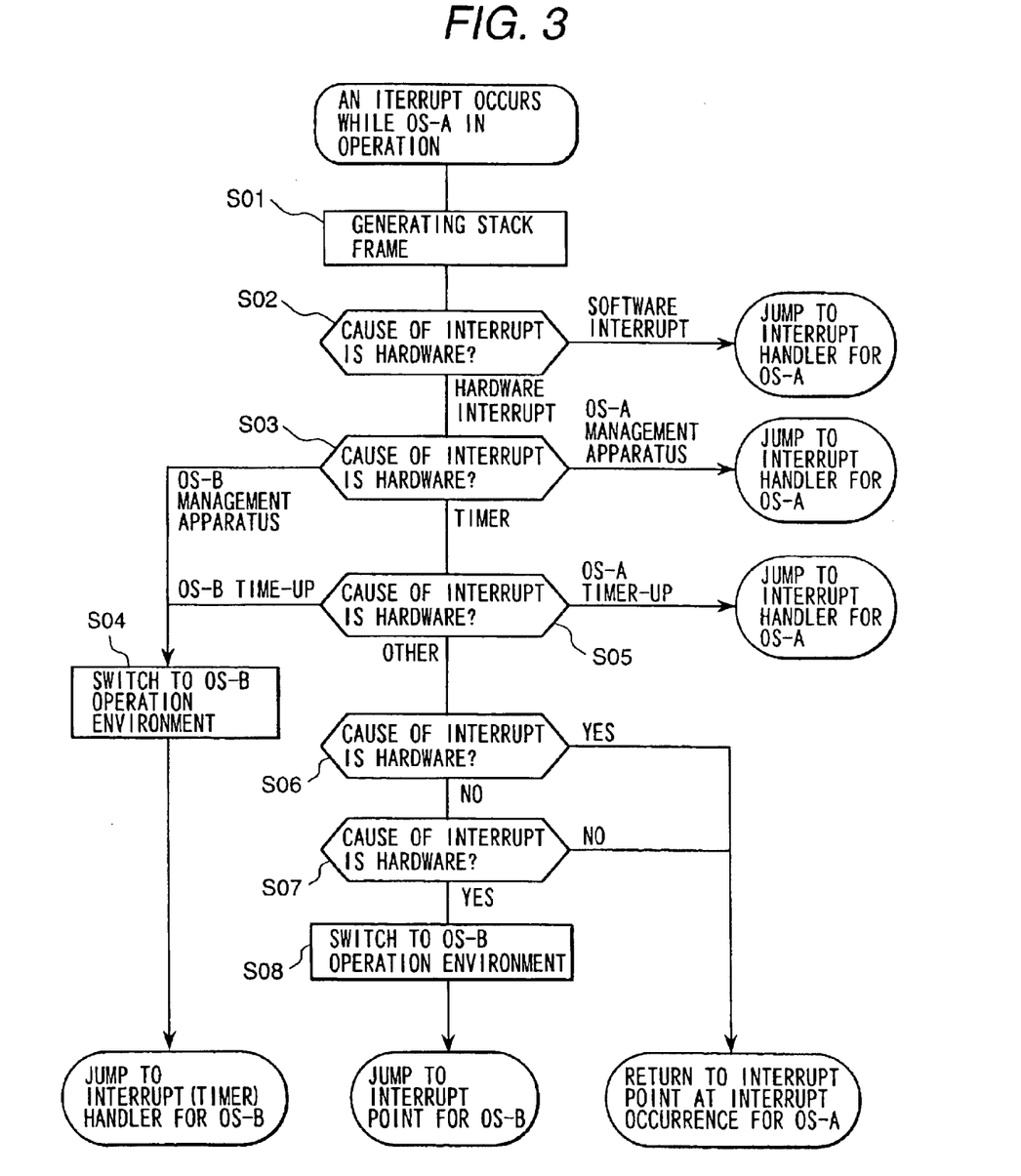
FIG. 3 is a flowchart showing procedures for the interrupt operation in the execution of OS-A.

FIG. 3 shows the procedural steps for the case that an interrupt occurs while OS-A with its execution being defined with nonpriority is in operation. As the result of the interrupt input, an interrupt processing routine of the inter-OS control software 23 is called, and the procedures shown in FIG. 3 are executed. At first, the content of the register when the interrupt occurs is transferred onto the stack and a stack frame is generated (S01). Next, by referring to an interrupt number (vector), what is judged is whether the interrupt is a software interrupt or a hardware interrupt (S02). In case of the software interrupt, the cause of the interrupt is either a case that an interrupt instruction is issued explicitly by the process of OS-A in operation or a case that an exception occurs due to its program operation, and in either case, the interrupt handler of OS-A itself is called. On the other hand, in case of the hardware interrupt, which hardware makes the cause of the interrupt is judged (S03). In case that the interrupt comes from the hardware managed by OS-A, the interrupt handler of OS-A itself is called in the similar manner to the software interrupt. In contrast, in case that the interrupt comes from the hardware managed by OS-B, the operation environment is switched to OS-B (S04), and then, the interrupt handler of OS-B itself is called. In case that the interrupt is a timer interrupt, the time when the interrupt occurs is identified (S05), and if the identified time is a time when the timer for OS-A or OS-B should be time up, the timer handler of the individual OS itself is called. In case that both timers reach the time for the scheduled time-up, the time-up of the timer for OS-A is made withheld, and only the timer handler of OS-B with its execution given priority is called.

Figure 4:
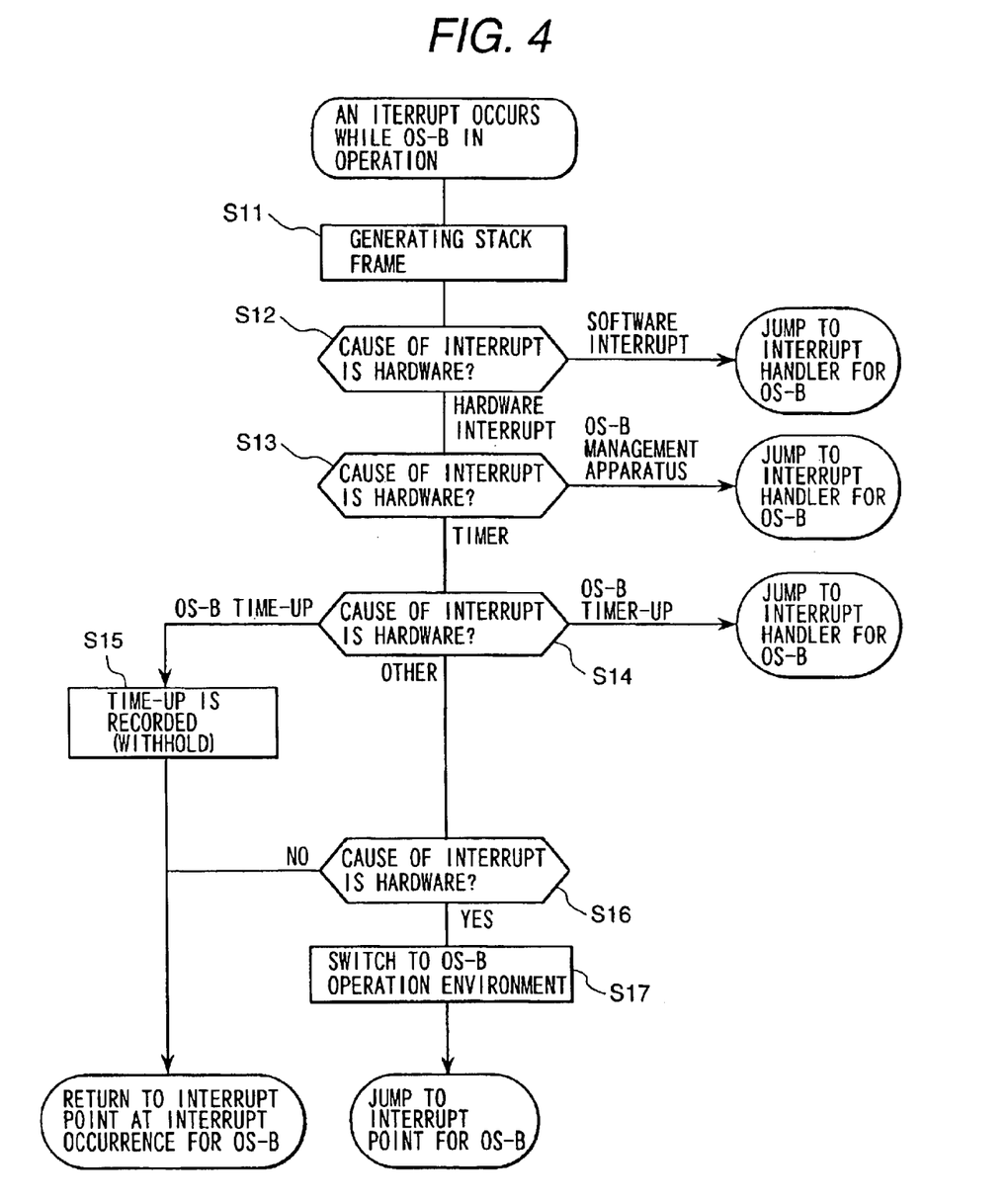
FIG. 4 is a flowchart showing procedures for the interrupt operation in the execution of OS-B.

FIG. 4 shows the procedural steps for the case that an interrupt occurs while OS-B with its execution being defined with priority is in operation. In this case, as in the similar manner to the case that an interrupt occurs while OS-A is in operation, as the result of the interrupt input, an interrupt processing routine of the inter-OS control software 23 is called, and the procedures shown in FIG. 4 are executed. At first, the content of the register when the interrupt occurs is transferred onto the stack (S11). Next, by referring to an interrupt number (vector), what is judged is whether the interrupt is a software interrupt or a hardware interrupt (S12). In case of the software interrupt, the interrupt handler of OS-B in operation is called. In case of the hardware interrupt, the interrupt controller 19 is made operated when enabling OS-B to be in operation, and the interrupt from the hardware managed by OS-A is masked. Thus, the interrupt by the hardware managed by OS-A doe not occur while OS-B is in operation. In case that an interrupt occurs at the hardware managed by OS-B, the interrupt handler of OS-B itself is called in the similar manner to the case for the software interrupt. However, in case that the interrupt is a timer interrupt, the time when the interrupt occurs is identified (S14), and if the identified time is a time when the timer for OS-B should be time up, the timer handler of OS-B itself is called. If the identified time is a time when the timer for OS-A should be time up, the fact of the occurrence of the time up is recorded (S15), and the operation of OS-B is recovered. As the system has such a hardware configuration that the operation of the interrupt controller 19 is not allowed explicitly, the cause of the interrupt is judged to be an apparatus managed by OS-A, the fact of the occurrence of the interrupt is recorded when the cause of the interrupt is judged (S13), and the interrupt handler of OS-A itself may be called when enabling OS-A to be in operation.

The above description refers to the operation in case that OS-B is made given priority completely. In this process, the operation for switching from OS-B to OS-A is executed only when OS-B turns into an idle state, and a process for notifying the fact of the idle state from OS-B to the inter-OS control software 23 is called. In view of the avoidance of the deadlock when OS-B gets into an infinite loop, an operation of OS-A is scheduled in a definite time fraction. Thus, an timer interrupt is made occur at the time other than the time when the timers for OS-A and OS-B are count up, and OS's are switched in the interrupt process of the inter-OS control software 23. In the inter-OS control software 23, the execution time for the individual OS's are estimated before hand. If a timer interrupt occurs while OS-B is in operation, whether the time for switching from OS-B to OS-A has come is judged by referring to the pre-defined execution time of OS-B (S16), and then, if the time for switching to OS-A has come, OS-A is made enabled to be in operation (S17) and the procedure goes to the interrupt point for OS-A. If the time for switching to OS-A has not come, the procedure visits again the interrupt point at the time when the interrupt of OS-B occurs. In contrast, a timer interrupt occurs while OS-A is in operation, in the procedure shown in FIG. 3, whether OS-B is staying in an idle state is judged (S06), and then, if OS-B is not in an idle state, whether the time has passed for going back to OS-B is judged (S07). If the time has passed for going back to OS-B, OS-B is made enabled to be in operation (S08), and the procedure goes to the interrupt point for OS-B. However, if OS-B is staying in an idle state or the time has not passed for going back to OS-B, then the procedure visits again the interrupt point at the when the interrupt of OS-A occurs again.

Figure 5:
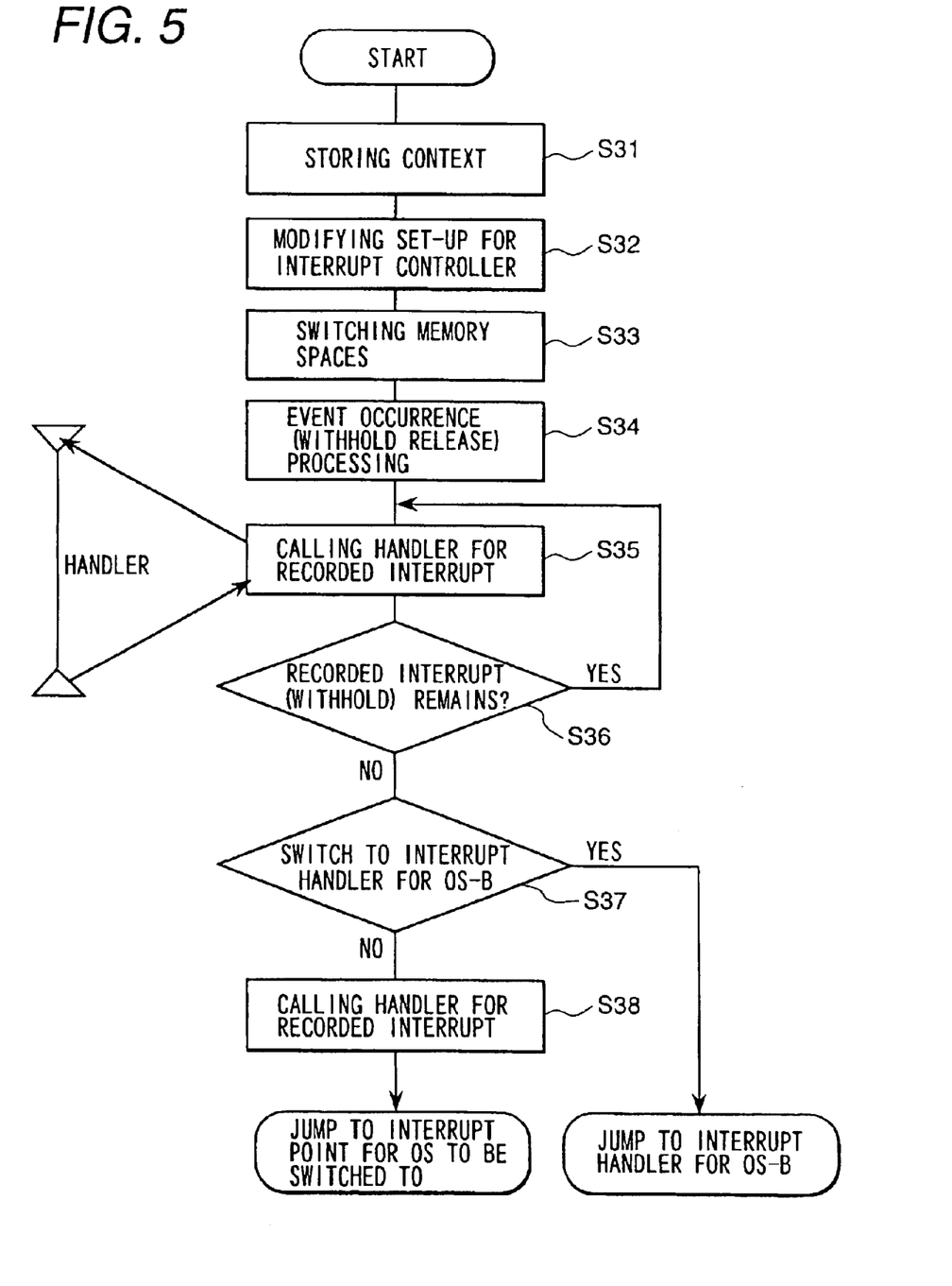
FIG. 5 is a flowchart showing procedures for the switching operation of OS's.

FIG. 5 shows a detail procedure of switching OS's in the inter-OS control software 32. The OS switching procedure is invoked in case that the switching procedure is required in the interrupt process described above, that OS-B turns into an idle state or that the stand-by state of the stand-by program. of OS-B is required to be cancelled in responsive to the notification of the event which will be described later. At first, the context at the point (hereinafter referred to as "interrupt point") when the interrupt occurs or the inter-OS control software 23 is invoked is stored (S31). This means that the stack frame position where the content of the register in CPU11 at the interrupt point is recorded and the values of the instruction counter and the stack pointer are recorded. Next, the property of the interrupt controller 19 is modified so as to apply a mask for preventing the interrupt of OS-A while OS-B is in operation or to cancel a mask for the interrupt of OS-A.

Next, the register indicating the top memory position of the page table is modified and the memory space is made switched (S33). This operation is as same as described before. Next, the notification of the event between OS's is executed (S34), which will be described later in detail. When switching from OS-A to OS-B, the interrupt routine corresponding to the interrupt with its causal event recorded in step S15 of the procedure shown in FIG. 4 is called and the suspended interrupt operations are made executed (S35). Then, after completing all the recorded interrupt operations (S36), the context stored in S31 while suspending the interrupt operations is recovered (S38), and the procedure visits again the interrupt point of the switched OS. All the necessary data are stored on the memory so that the content of the register may be deleted when OS-B is expected to be switched to OS-A while OS-B is staying in an idle state, and the context is made not recovered when the interrupt handler of OS-B is called (S37).

The interrupt controller 19 can mask the individual interrupt operation by specifying its interrupt number, and in case that OS-A operates independently, the interrupt mask with lower priority is applied while processing the interrupt operation of OS-A in case that the masked interrupt include the interrupt of OS-B, a time day occurs in the corresponding interrupt operation until the mask is released. In order to avoid this time delay, it is required to modify the interrupt controller process in the kernel of OS-A so that the interrupt operation with the interrupt number for OS-B may be made disabled. On the other hand, the timer interrupt of OS-A is processed only in a definite time interval in responsive to the interrupt signal from the timer 14, and thus, the timer 14 is not operated while OS-A is in operation, but operated once at the initialization process. Therefore, the interrupt signal from the timer 14 is received temporarily by the inter-OS control software 23, and it is allowed that the interrupt handler of OS-A is only called in the steps after S03 of the procedure shown in FIG. 3.

Figure 6:
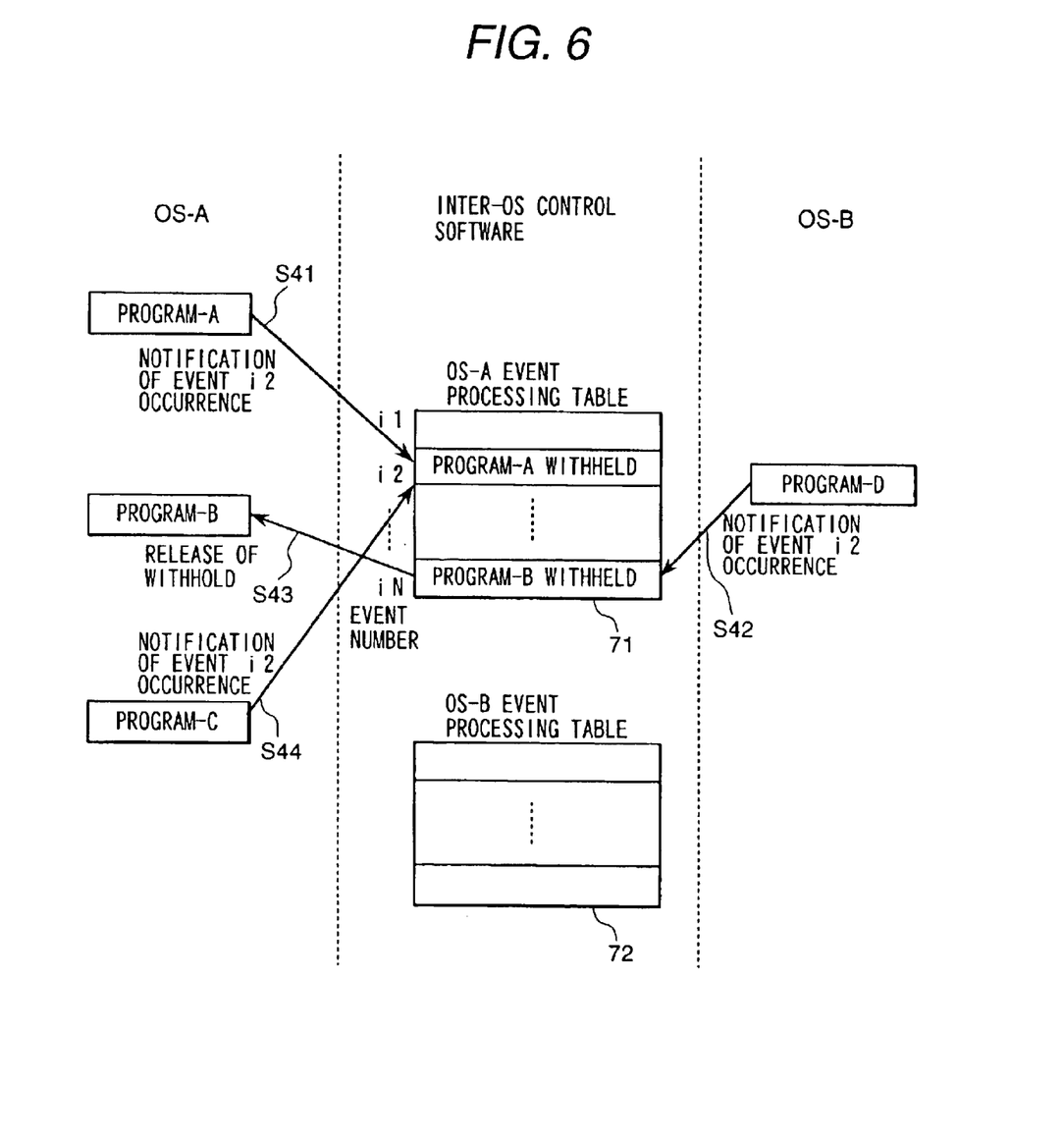
FIG. 6 is a schematic diagram showing a function for issuing and notifying events.

There is such a case that the inter-OS control software 23 is called explicitly by either OS for the communication function between a couple of OS's. A function for issuing and notifying events between OS's as a basic function for communicating between a couple of OS's is shown in FIG. 6.

There exists an OS-A event processing table 71 on the memory managed by the inter-OS control software 23. Event numbers, i1, i2, . . . iN, are assigned to the events enabled to be processed, and there exist their corresponding N entries. The event table is empty at the initial state. After the OS-A program (Program A) specifies the event number (i2) and notifies the occurrence of the event and issues the suspend request to the inter-OS control software 23 (S41), the inter-OS control program 23 records into the entry i2 of the corresponding event on the table 71 that the program (Program A) is in a suspended state. The program issuing the suspend request stops its operation by the program interrupt function of OS-A. Next, if the OS-B program (Program B) notifies an event occurrence with its event number (iN) (S42), the inter-OS control software 23 looks up the corresponding entry iN in the table 71 and judges the existence of the program suspended on OS-A. In case that there is a suspended program, the release request for the suspended program (Program B) is issued to OS-A. In responsive to this request, the program suspended on OS-A is restarted and recognized that the suspended event is activated. The notification of event activation is allowed from the program (Program C) executed on OS-A (S44). Thus, the events issued on an identical OS and the events issued on the different OS's can be made stood by simultaneously. In the similar manner, there is an event processing table 72 for OS-B is defined, and the event to be issued can be watched by the program on OS-B in contrast to the previous case.

The interrupt and restart function of the program used in the event notification described above can be realized by a function of OS-A for reporting that the inter-OS control software 23 operating as a device driver starts and terminates the input and output operation to the device. For OS-B, this function can be realized by the inter-OS control software 23 calling a routine of OS-B for starting and terminating directly the program. Though the scope of suspend operation is assumed to be on the basis of program in the explanation of the event notification in the above description, the interrupt and restart operation is applied on the thread-by-thread basis in the operating systems providing a multi-thread environment. Though the event process table is defined so as to contain the program numbers, it is allowed that it may contain the structures in OS and their pointers for judging the suspended programs in stead. In addition, the system is composed with another buffer formed on the memory managed by the inter-OS control software 23, and it is operated so that the data may be received from the side of issuing an event and recorded onto the buffer at the same time when the event is issued, and that the data may be transferred when the suspended state is released, and thus, a message communication function having a function for waiting the event arrival can be realized.

The inter-OS control software 23 provides a function that allows an continuous operation of either one of OS-A or OS-B, and interrupts and restart the other OS.

At first, what is described is an operation for terminating and restarting OS-B while operating continuously OS-A. In case that OS-B is shut down, or that OS-B is made terminated forcibly due to an exception, a routine of the inter-OS control software 23 is called and is made notified. As the inter-OS control software 23 does not allow OS-B to be switched from its suspend state to being in operation from this notification onward, only OS-A continues to be in operation. As OS-B is made started in responsive to a designated initialization routine called by the inter-OS control software 23, its restart can be executed in the similar manner to its ordinary start-up.

Figure 7:
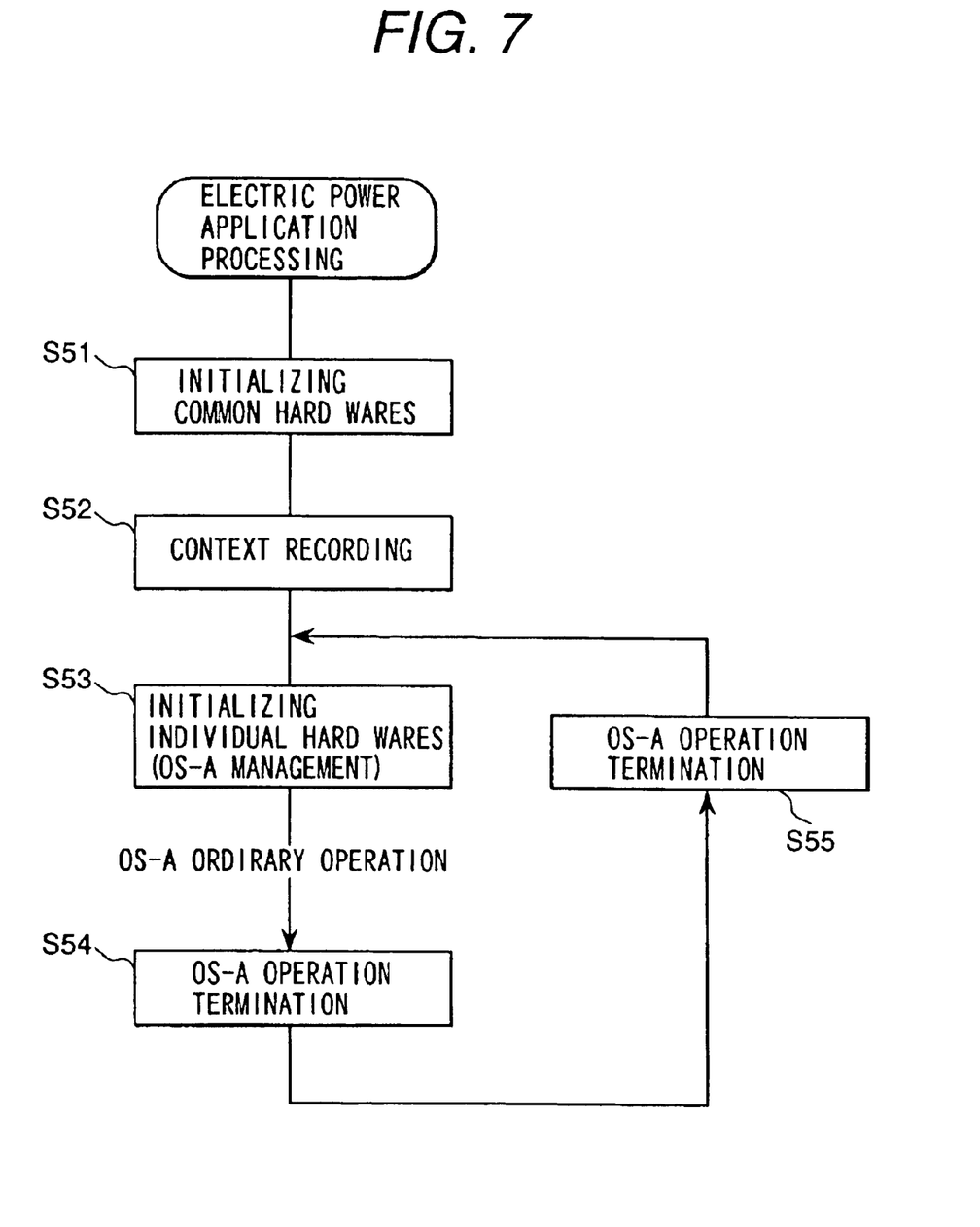
FIG. 7 is a flowchart showing procedures for restarting OS-A exclusively.

Next, what is described is an operation for terminating and restarting OS-A while operating continuously OS-B. When OS-A is shut down, the program executed on OS-A detects the execution of shut-down operation and notifies it to the inter-OS control software 23. When an exception occurs in OS-A, the interrupt handler of the inter-OS control software 23 judges the exception. In case that OS-A is shut down or an exception occurs, as the inter-OS control software 23 does not allow OS-B to be switched from its suspend state to being in operation, then OS-A continues to be in operation. However, if OS-A in a suspend state is made restarted in the similar manner to an ordinary start-up, common hard wares including a bus shared with OS-B are initialized, which may prevent OS-B from operating continuously. In order to solve this problem, a restart operation is performed in the procedure shown in FIG. 7 after terminating OS-A. When an electric power is applied, OS-A initializes the common hard wares (S51). Then, the inter-OS control software 23 operating as a device driver is provided with a timing for initialization process for the hard wares managed by OS-A, in which the context is stored (S52). In storing the context, the content of the register and the content of all the memory area managed by OS-A are copied on the memory area managed by the inter-OS control software 23. Then, the hard wares managed by OS-A are initialized by the individual device drivers of OS-A (S53). After completing this initialization process, OS-A goes to an ordinary operation state, and in case that OS-A is terminated due to a shut-down operation or an exception, the inter-OS control software 23 shuts down only OS-A in the above described manner (S54). Then, the inter-OS control software 23 restores the context stored at OS-A automatically or in responsive to the request from the program of OS-B (S55). That is, by referring to the context stored at the initialization process (S52) for the hard wares managed by OS-A, the content of the memory at the initialization state is recovered and the content of the register is recovered, and then, the operation of OS-A is restarted. With this procedure, as the execution of OS-A is restarted immediately after completing the set-up of the common hard wares managed by OS-A, and OS-A can be operated in an ordinary mode after only initializing the hard wares managed by OS-A, there is no need for initializing again the common hard wares shared by OS-B.

In this embodiment, as for OS-A used as a versatile OS, only the process for the interrupt controller 19 is modified, and other process or components are not modified. This makes it easier to add OS-B and the inter-OS control software 23 for OS-A used as a versatile OS.

According to the present invention, when operating plural OS's on a single CPU in the control apparatus, the area of influence of the abnormal behavior of OS's and their related programs can be localized, and the abnormal state can be transferred to an ordinary operation mode only by restarting the partial component on the basis of the individual OS's without terminating the whole control apparatus, which leads to increasing the reliability of the system In addition, the operation of OS's can be observed from the space independent of the spaces for the ordinary operation of OS's and their programs.

What is claimed is:

1. A multiple operating system control apparatus for a multiple operating system having plural operating systems executed in a digital arithmetic processor and including a first operating system and a second operating system and a plurality of pieces of hardware, each piece of hardware assigned to a corresponding operating system, comprising:
respective pieces of hardware having assigned interrupt numbers stored in a table so as to maintain the operating systems independent from each other;
the digital arithmetic processor programmed to alternately switch, under inter-operating system control software control, on the basis of said table, between and said first and second operating systems to alternately execute said first and second operating systems; and
an interrupt number or an input and output address used by said second operating system for said first operating system when starting said first operating system being reserved.

2. The multiple operating system control apparatus of claim 1,
wherein each of said first and second operating systems include a conversion table used by said digital arithmetic processor for converting a virtual memory address to a physical address; and
said digital arithmetic processor is programmed to include a procedure for directing said digital arithmetic processor to use the conversion table for an operating system to be executed after switching is executed when selecting and switching an operating system, which is called as a interrupt processing routine or called by said first and second operating systems individually when an interrupt occurs.

3. The multiple operating system control apparatus of claim 1, and further comprising:
a. said digital arithmetic processor having a priority level for each individual operating system of said plural operating systems during operation;
b. said digital arithmetic processor being programmed to preferentially execute a program on a high priority operating system by:
i. not switching the high priority operating system to an operating system with a lower priority level, or
ii. switching the high priority operating system to an operating system lower in priority for a definite time interval and then switching back to the operating system with a high priority.

4. The multiple operating system control apparatus according to claim 1, wherein the interrupt table is divided into two so as to separately use them for the operating systems, the interrupt table being switched from one of the two to the other thereof when an interrupt occurs.

5. The multiple operating system control apparatus according to claim 1, wherein I/O addresses assigned respectively to the pieces of hardware are stored in the table so as to maintain the operating systems independent of each other.

6. The multiple operating system control apparatus according to claim 5, and further including an interrupt controller and a timer and wherein the inter-operating system control software accepts an interrupt from said interrupt controller and an interrupt from said timer.

7. The multiple operating system control apparatus according to claim 6, wherein the inter-operating system control software causes one of the operating systems to be assigned more preferentially than the other.

8. The multiple operating system control apparatus according to claim 7, wherein the other of the operating systems is operated as a device driver.

9. The multiple operating system control apparatus according to claim 8, wherein the operating systems and the inter-operating system control software are operated in a privileged mode, but a program is not.

10. An apparatus comprising:
a. a digital arithmetic processor having at least a first operating system and a second operating system operating therein, said processor having inter-operating system control software to switch therebetween;
b. a plurality of pieces of hardware, each piece of hardware assigned to a corresponding operating system, with respective pieces of hardware having assigned interrupt numbers stored in a table so as to maintain the operating systems independent from each other.

11. The apparatus of claim 10 wherein:
the digital arithmetic processor is programmed to alternately switch, under inter-operating system control software control, on the basis of said table, between and said first and second operating systems to alternately execute said first and second operating systems; and
an interrupt number or an input and output address used by said second operating system for said first operating system when starting said first operating system is reserved.

12. The apparatus of claim 11, wherein:
wherein each of said first and second operating systems include a conversion table used by said digital arithmetic processor for converting a virtual memory address to a physical address; and
said digital arithmetic processor is programmed to include a procedure for directing said digital arithmetic processor to use the conversion table for an operating system to be executed after switching is executed when selecting and switching an operating system, which is called as a interrupt processing routine or called by said first and second operating systems individually when an interrupt occurs.

13. The apparatus of claim 10, and further comprising:
a. said digital arithmetic processor having a priority level for each individual operating system of said plural operating systems during operation;
b. said digital arithmetic processor being programmed to preferentially execute a program on a high priority operating system by:
i. not switching the high priority operating system to an operating system with a lower priority level, or
ii. switching the high priority operating system to an operating system lower in priority for a definite time interval and then switching back to the operating system with a high priority.

14. The apparatus according to claim 10, wherein the interrupt table is divided into two so as to permit separate use for the operating systems, the interrupt table being switched from one of the two to the other thereof when an interrupt occurs.

15. The apparatus according to claim 10, wherein I/O addresses assigned respectively to the pieces of hardware are stored in the table so as to maintain the operating systems independent of each other.

16. The apparatus according to claim 10, and further in including an interrupt controller and a timer and wherein the inter-operating system software accepts an interrupt from said interrupt controller and an interrupt from said timer.

17. The apparatus according to claim 16, wherein the inter-operating system software causes one of the operating systems to be assigned more preferentially than the other.

18. The apparatus according to claim 17, wherein the other of the operating systems is operated as a device driver.

19. The apparatus according to claim 18, wherein the operating systems and the inter-operating system control software are operated in a privileged mode, but a program is not.

20. A multiple operating system comprising:
   a. a digital arithmetic processor having plural operating systems executed therein including a first operating system and a second operating system;
   b. and a plurality of pieces of hardware, each piece of hardware assigned to a corresponding operating system, said respective pieces of hardware having assigned interrupt numbers;
   c. a table storing said assigned interrupt numbers so as to maintain the operating systems independent from each other, the digital arithmetic processor programmed to alternately switch, under inter-operating system control software control, on the basis of said table, between and said first and second operating systems to alternately execute said first and second operating systems; and
   d. an interrupt number or an input and output address used by said second operating system for said first operating system when starting said first operating system being reserved.

21. The multiple operating system of claim 20 and further including:
   a conversion table for converting a virtual memory address to a physical address included in each of said first and second operating systems.

22. The multiple operating system of claim 20 wherein:
   said digital arithmetic processor is programmed to include a procedure for directing said digital arithmetic processor to use the conversion table for an operating system to be executed after switching is executed when selecting and switching an operating system, which is called as a interrupt processing routine or called by said first and second operating systems individually when an interrupt occurs.

23. The multiple operating system of claim 20, wherein:
   a. said digital arithmetic processor has a priority level for each individual operating system of said plural operating systems during operation;
   b. said digital arithmetic processor is programmed to preferentially execute a program on a high priority operating system by:
      i. not switching the high priority operating system to an operating system with a lower priority level, or
      ii. switching the high priority operating system to an operating system lower in priority for a definite time interval and then switching back to the operating system with a high priority.

24. The multiple operating system according to claim 20, wherein the interrupt table is divided into two so as to separately use them for the operating systems, the interrupt table being switched from one of the two to the other thereof when an interrupt occurs.

25. The multiple operating system according to claim 20, wherein I/O addresses assigned respectively to the pieces of hardware are stored in the table so as to maintain the operating systems independent of each other.

26. The multiple operating system according to claim 25, and further including an interrupt controller and a timer and wherein the inter-operating system control software accepts an interrupt from said interrupt controller and an interrupt from said timer.

27. The multiple operating system according to claim 26, wherein the inter-operating system control software causes one of the operating systems to be assigned more preferentially than the other.

28. The multiple operating system according to claim 27, wherein the other of the operating systems is operated as a device driver.

29. The multiple operating system according to claim 28, wherein the operating systems and the inter-operating system control software are operated in a privileged mode, but a program is not.

* * * * *